US012628099B2

(12) United States Patent
Min

(10) Patent No.: US 12,628,099 B2
(45) Date of Patent: May 12, 2026

(54) TERMINAL

(71) Applicant: NTT DOCOMO, INC., Tokyo (JP)

(72) Inventor: Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 379 days.

(21) Appl. No.: 18/000,753

(22) PCT Filed: Jun. 9, 2021

(86) PCT No.: PCT/JP2021/021975
§ 371 (c)(1),
(2) Date: Dec. 5, 2022

(87) PCT Pub. No.: WO2021/251439
PCT Pub. Date: Dec. 16, 2021

(65) Prior Publication Data
US 2023/0217388 A1 Jul. 6, 2023

(30) Foreign Application Priority Data

Jun. 10, 2020 (JP) ................................. 2020-101148

(51) Int. Cl.
*H04W 56/00* (2009.01)
*H04W 48/14* (2009.01)

(52) U.S. Cl.
CPC ....... *H04W 56/0015* (2013.01); *H04W 48/14* (2013.01)

(58) Field of Classification Search
CPC . H04W 56/0015; H04W 48/14; H04W 48/12; H04W 56/00; H04W 48/10
See application file for complete search history.

(56) References Cited

U.S. PATENT DOCUMENTS

| | | | | |
|---|---|---|---|---|
| 12,317,222 B2 * | 5/2025 | Fu | .......................... | H04W 48/14 |
| 2004/0023678 A1 * | 2/2004 | Fredriksson | .......... | H04J 3/0638 |
| | | | | 455/422.1 |
| 2019/0229843 A1 * | 7/2019 | Yoshimoto | ............ | H04L 5/0055 |
| 2019/0327030 A1 * | 10/2019 | Yoshimoto | ............ | H04L 1/0061 |
| 2020/0267672 A1 * | 8/2020 | Chien | ............... | H04W 56/0055 |
| 2020/0351728 A1 * | 11/2020 | Chien | ................ | H04W 56/001 |
| 2021/0298072 A1 * | 9/2021 | Oh | ..................... | H04W 72/0446 |
| 2021/0345272 A1 * | 11/2021 | Chatterjee | ............. | H04W 80/02 |
| 2022/0104160 A1 * | 3/2022 | Tang | ..................... | H04W 56/00 |
| 2022/0200733 A1 * | 6/2022 | Toeda | ................ | H04W 56/001 |
| 2022/0217664 A1 * | 7/2022 | Toeda | ................ | H04W 56/002 |

(Continued)

FOREIGN PATENT DOCUMENTS

| | | | | |
|---|---|---|---|---|
| EP | 3419340 A1 * | 12/2018 | ............ | H04W 72/30 |
| WO | WO-2022078472 A1 * | 4/2022 | ........ | H04W 56/0045 |

OTHER PUBLICATIONS

Vivo :UE report of the TSC interest; 3GPP TSG-RAN WG2 Meeting #109-e R2-2000489 Electronic Meeting, Feb. 28-Mar. 6, 2020, with date Feb. 14, 2020 (Year: 2020).*

(Continued)

*Primary Examiner* — Wutchung Chu
(74) *Attorney, Agent, or Firm* — Osha Bergman Watanabe & Burton LLP

(57) ABSTRACT

A UE 200 acquires time information used in a system from a network. The UE 200 receives a message indicating that the time information is updated from the network, and acquires the time information according to the reception of the message.

4 Claims, 7 Drawing Sheets

(56) References Cited

U.S. PATENT DOCUMENTS

| | | | | |
|---|---|---|---|---|
| 2022/0240205 A1* | 7/2022 | Chien | ............... | H04W 56/0055 |
| 2022/0360389 A1* | 11/2022 | Luo | ........................ | H04L 5/0048 |
| 2022/0386262 A1* | 12/2022 | Liberg | .................. | G01S 5/0236 |
| 2023/0007621 A1* | 1/2023 | Fu | .......................... | H04W 48/12 |
| 2023/0049980 A1* | 2/2023 | Sharma | ............... | H04W 12/041 |
| 2023/0126466 A1* | 4/2023 | Pan | ........................ | H04W 76/23 |
| | | | | 455/11.1 |
| 2023/0137050 A1* | 5/2023 | Park | .................. | H04W 56/0015 |
| | | | | 370/503 |
| 2023/0199578 A1* | 6/2023 | Wu | ..................... | H04W 36/305 |
| | | | | 370/331 |
| 2023/0217386 A1* | 7/2023 | Orsino | .................. | H04W 48/12 |
| | | | | 370/503 |
| 2023/0217388 A1* | 7/2023 | Min | ...................... | H04W 56/00 |
| | | | | 370/350 |
| 2024/0430836 A1* | 12/2024 | Shimoda | ........... | H04W 56/0015 |

OTHER PUBLICATIONS

International Search Report for corresponding International Application No. PCT/JP2021/021975, mailed Aug. 10, 2021 (6 pages).
Written Opinion for corresponding International Application No. PCT/JP2021/021975, mailed Aug. 10, 2021 (4 pages).
Nokia et al; "Revised WID: Support of NR Industrial Internet of Things (IoT)"; 3GPP TSG RAN Meeting #85, RP-192324; Newport Beach, USA; Sep. 16-20, 2019 (6 pages).
Ericsson (Rapporteur); "Correction of NR IIoT"; 3GPP TSG-RAN WG2 Meeting #110-e, R2-2004955; Electronic; Jun. 1-12, 2020 (74 pages).
RAN2; "RAN2 CRs to Support of NR Industrial Internet of Things (IoT): Core part"; 3GPP TSG-RAN Meeting #87, RP-200352; Online; Mar. 16-19, 2020 (151 pages).
RAN2; "RAN2 CRs to 2-step RACH for NR"; 3GPP TSG-RAN Meeting #87, RP-200342; Online; Mar. 16-19, 2020 (580 pages).
Vivo; "Report of [AT109bis-e][025][IIOT] Accurate Reference Timing (vivo)"; 3GPP TSG-RAN WG2 #109b-e, R2-2004150; Electronic; Apr. 20-30, 2020 (22 pages).
Office Action issued in Japanese Application No. 2022-530610, mailed Jan. 7, 2025 (8 pages).
MediaTek Inc.: "On Channel Access Procedure"; 3GPP TSG RAN WG1 #96, R1-1901798; Athens, Greece, Feb. 25-Mar. 1, 2019 (7 pages).
Ericsson: "On UE need for time sync"; 3GPP TSG-RAN WG2 #109bis-e, R2-2002705; Electronic, Apr. 20-30, 2020 (2 pages).
Office Action issued in Chinese Patent Application No. 202180039812.5, dated Apr. 30, 2025 (17 pages).
3GPP TSG-RAN WG2 Meeting #109-e; R2-2001048; Nokia, Nokia Shanghai Bell; "Determining the need for accurate reference time delivery"; Online, Feb. 24-Mar. 6, 2020 (8 pages).
3GPP TSG-RAN WG2 Meeting #109bis-e; R2-2003167; Nokia, Nokia Shanghai Bell; "Remaining issues for accurate reference time delivery"; Elbonia, Online, Apr. 20-30, 2020 (10 pages).
3GPP TSG-RAN WG5 Meeting #82; R5-192796; Teoco Corporation, Qualcomm Inc; "New RRC test case 8.1.5.2.2 SI change / Notification of BCCH modification / Short message for SI update in NR RRC_Connected state"; Athens, Greece, Feb. 25-Mar. 1, 2019 (5 pages).
Office Action issued in Chinese Patent Application No. 202180039812.5, dated Sep. 30, 2025 (14 pages).

* cited by examiner

FIG. 3

*ReferenceTimeInfo* information element

```
-- ASN1START
-- TAG-REFERENCETIMEINFO-START

ReferenceTimeInfo-r16 ::= SEQUENCE {
    time-r16                  ReferenceTime-r16,
    uncertainty-r16           INTEGER (0..32767)              OPTIONAL,    -- Need S
    timeInfoType-r16          ENUMERATED {localClock}         OPTIONAL,    -- Need S
    referenceSFN-r16          INTEGER (0..1023)               OPTIONAL     -- Cond RefTime
}

ReferenceTime-r16 ::=         SEQUENCE {
    refDays-r16               INTEGER (0..72999),
    refSeconds-r16            INTEGER (0..86399),
    refMilliSeconds-r16       INTEGER (0..999),
    refTenNanoSeconds-r16     INTEGER (0..99999)
}
```

FIG. 4

```
OtherConfig-v16xy ::=                          SEQUENCE {
  drx-PreferenceConfig-r16                       SetupRelease {DRX-PreferenceConfig-r16}                      OPTIONAL,  -- Need M
  maxBW-PreferenceConfig-r16                     SetupRelease {MaxBW-PreferenceConfig-r16}                    OPTIONAL,  -- Need M
  maxCC-PreferenceConfig-r16                     SetupRelease {MaxCC-PreferenceConfig-r16}                    OPTIONAL,  -- Need M
  maxMIMO-LayerPreferenceConfig-r16             SetupRelease {MaxMIMO-LayerPreferenceConfig-r16}            OPTIONAL,  -- Need M
  minSchedulingOffsetPreferenceConfig-r16      SetupRelease {MinSchedulingOffsetPreferenceConfig-r16}      OPTIONAL,  -- Need M
  releasePreferenceConfig-r16                    SetupRelease {ReleasePreferenceConfig-r16}                  OPTIONAL,  -- Need M
  referenceTimePreferenceReporting-r16         ENUMERATED {true}                                           OPTIONAL   -- Need R
}

UEAssistanceInformation-v16xy-IEs ::= SEQUENCE {
  idc-Assistance-r16                  IDC-Assistance-r16                     OPTIONAL,
  drx-Preference-r16                  DRX-Preference-r16                     OPTIONAL,
  maxBW-Preference-r16                MaxBW-Preference-r16                   OPTIONAL,
  maxCC-Preference-r16                MaxCC-Preference-r16                   OPTIONAL,
  maxMIMO-LayerPreference-r16         MaxMIMO-LayerPreference-r16            OPTIONAL,
  minSchedulingOffsetPreference-r16   MinSchedulingOffsetPreference-r16     OPTIONAL,
  releasePreference-r16               ReleasePreference-r16                  OPTIONAL,
  sl-UE-AssistanceInformationNR-r16   SL-UE-AssistanceInformationNR-r16     OPTIONAL,
  referenceTimeInfoPreference-r16     BOOLEAN                                                               OPTIONAL,
  nonCriticalExtension                SEQUENCE {}                            OPTIONAL
}
```

FIG. 7

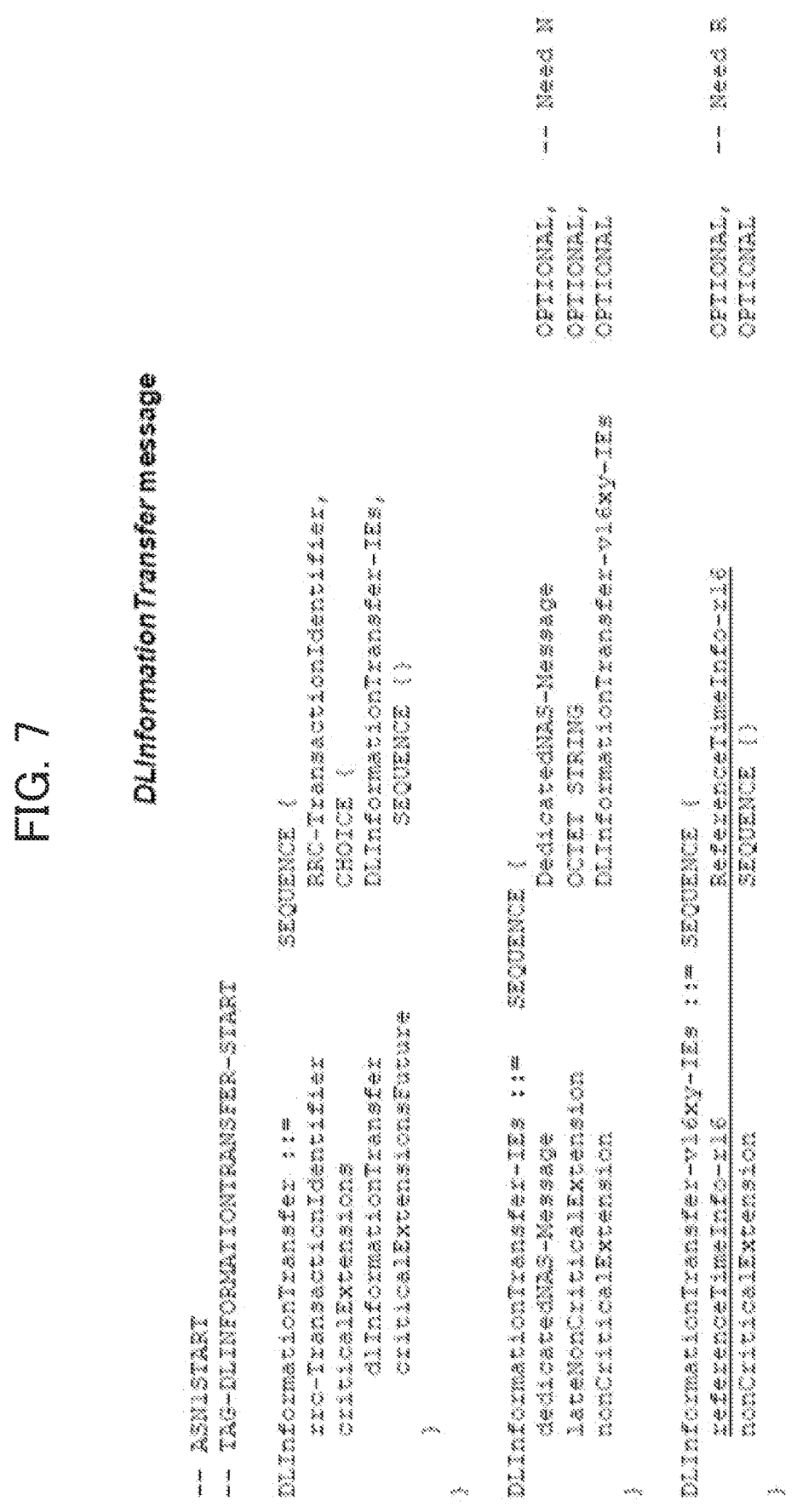

DLInformationTransfer message

```
ASN1START

TAG-DLINFORMATIONTRANSFER-START

DLInformationTransfer ::=          SEQUENCE {
    rrc-TransactionIdentifier          RRC-TransactionIdentifier,
    criticalExtensions                 CHOICE {
        dlInformationTransfer              DLInformationTransfer-IEs,
        criticalExtensionsFuture           SEQUENCE {}
    }
}

DLInformationTransfer-IEs ::= SEQUENCE {
    dedicatedNAS-Message               DedicatedNAS-Message           OPTIONAL,  -- Need N
    lateNonCriticalExtension           OCTET STRING                   OPTIONAL,
    nonCriticalExtension               DLInformationTransfer-v16xy-IEs  OPTIONAL
}

DLInformationTransfer-v16xy-IEs ::= SEQUENCE {
    referenceTimeInfo-r16              ReferenceTimeInfo-r16          OPTIONAL,  -- Need N
    nonCriticalExtension               SEQUENCE {}                    OPTIONAL
}
```

TERMINAL

TECHNICAL FIELD

The present invention relates to a terminal for executing radio communication, particularly a terminal for acquiring time information in an NR (5G) system.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

3GPP Release-16 will see NR support for Industrial Internet of Things (IIoT) (see Non-Patent Literature 1). To enable support for IIoT, synchronizing a radio base station (gNB) with a terminal (User Equipment, UE) is listed as a work item (WI).

Specifically, in order to realize high-precision synchronization between the gNB and the UE, it is proposed to include an information element (IE) called referenceTimeInfo-r16 in the System Information Block (SIB) 9 (see Non-Patent Literature 2). referenceTimeInfo-r16 (time information) indicates the NR (5G) Internalsystem clock (which may be referred to as time or timing).

It is also proposed that the UE may request the time information from the gNB (network) by including referenceTimePreference-r16 in the UEAssistanceInformation.

CITATION LIST

Non-Patent Literature

Non-Patent Literature 1 "Revised WID: Support of NR Industrial Internet of Things (IoT)", RP-192324, 3GPP TSG RAN Meeting #85, 3GPP, September 2019
Non-Patent Literature 2 "Correction of NR IIoT", R2-2004955, 3GPP TSG-RAN WG2 Meeting #110 e, 3GPP, June 2020

SUMMARY OF INVENTION

However, the operation related to synchronization between the gNB and the UE described in Non-Patent Literature 2 may have the following problems.

Specifically, when transmitting the updated time information (referenceTimeInfo-r16) to the UE, the gNB cannot notify the UE that the time information has been updated. Therefore, it is difficult for the UE to recognize the timing of acquiring the SIB 9 including the updated referenceTimeInfo-r16.

As described above, the UE can request time information from the network, but in this case, the gNB can transmit time information by SIB9 (broadcast) or DLInformationTransfer (unicast). Therefore, it is difficult for the UE to determine whether the time information is transmitted by SIB9 or DLInformationTransfer.

Accordingly, the following disclosure has been made in view of such a situation, and it is an object of the present invention to provide a terminal capable of quickly and efficiently acquiring time information in an NR (5G) system.

An embodiment of the present disclosure is a terminal (UE 200) provided with a control unit (control unit 250) that acquires time information used in a system from a network, and a reception unit (message processing unit 240) that receives a message indicating that the time information has been updated from the network, wherein the control unit acquires the time information in response to receiving the message.

An embodiment of the present disclosure is a terminal provided with a transmission unit (time management unit 230) that transmits a transmission request of time information used in a system to a network, and a reception unit (radio communication unit 210) that receives a downlink channel to which the time information is transmitted after transmitting the transmission request.

BRIEF DESCRIPTION OF DRAWINGS

FIG. 3 is a diagram showing a configuration example of a ReferenceTimeInfo.
FIG. 4 is a diagram showing a configuration example of OtherConfig and UEAssistanceInformation.
FIG. 7 is a diagram showing a configuration example of DLInformationTransfer.

MODES FOR CARRYING OUT THE INVENTION

Figure 1:
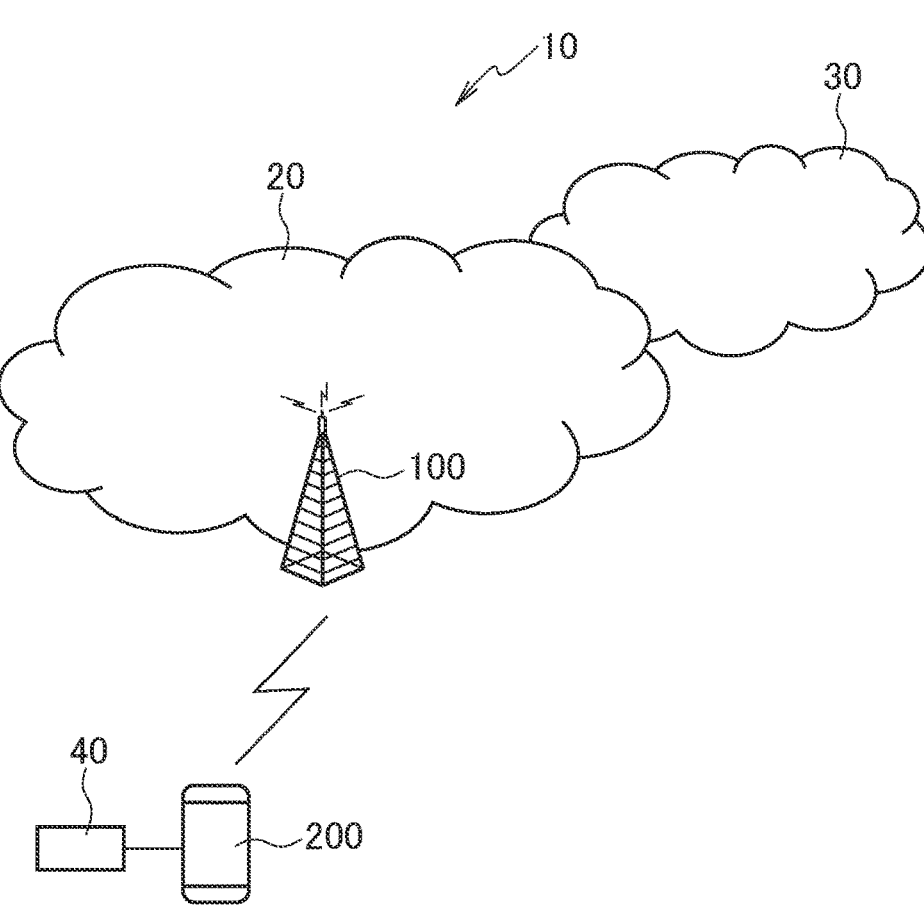
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of an radio communication system 10 according to this embodiment. radio communication system 10 is a 5 G New Radio (NR) compliant radio communication system and includes a Next Generation-Radio Access Network 20 (User Equipment 200, hereinafter UE 200), NG-RAN 20, and user terminal 200.

radio communication system 10 may be a radio communication system that follows a scheme called Beyond 5G, 5G Evolution or 6G.

The NG-RAN 20 includes a radio base station 100 (hereinafter, gNB 100). The specific configuration of radio communication system 10 including the number of gNBs and UEs is not limited to the example shown in FIG. 1.

The NG-RAN 20 actually includes a plurality of NG-RAN Nodes, specifically gNBs (or ng-eNBs), and is connected to a core network (5GC, not shown) according to 5G. Note that the NG-RAN 20 and 5 GC may be expressed simply as a "network".

The gNB 100 is a radio base station according to NR, and executes radio communication according to the UE 200 and NR. By controlling radio signals transmitted from a plurality of antenna elements, the gNB 100 and the UE 200 can support Massive MIMO that generates a beam with higher directivity, carrier aggregation (CA) that uses a plurality of component carriers (CCs) bundled together, and dual connectivity (DC) that simultaneously communicates between the UE and each of a plurality of NG-RAN nodes.

A Time Sensitive Network 30 (TSN 30) may be connected to the NG-RAN 20. For example, TSN 30 may be used as a network for Industrial Internet of Things (IIoT).

The TSN 30 may be configured as a separate network from the NG-RAN 20 and 5 GC, or NR (5G) system, and may be synchronized with the timing of independent clock generation.

An end station 40 may be connected to the UE 200. The end station 40 may be a communication device (terminal) included in the TSN 30, i.e., the IIoT, and may be synchronized with timing (time information) in the TSN 30.

As described above, in the present embodiment, the TSN 30 and the end station 40 can be connected to the NR (5G) system, and a mechanism for achieving high-precision synchronization between the gNB 100 and the UE 200 is provided.

Specifically, a mechanism for quickly and efficiently updating the time information in the NR (5G) system (Hereinafter omitted in the system as appropriate) is applied. With this, radio communication system 10 is designed for applications that require high-precision synchronization, such as IIoT.

(2) Function Block Configuration of Radio Communication System

Figure 2:
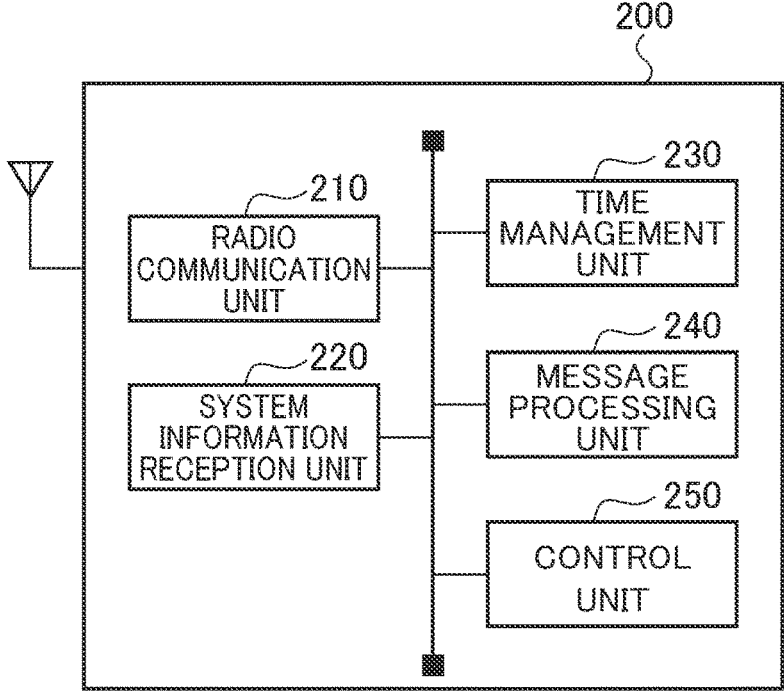
FIG. 2 is a functional block diagram of the UE 200.

Next, the functional block configuration of radio communication system 10 will be described. Specifically, the functional block configuration of the UE 200 will be described. FIG. 2 is a functional block diagram of the UE 200.

As shown in FIG. 2, the UE 200 includes a radio communication unit 210, a system information reception unit 220, a time management unit 230, a message processing unit 240, and a control unit 250.

The radio communication unit 210 transmits and receives a radio signal according to NR. The radio communication unit 210 supports Massive MIMO, CA using a plurality of CCs bundled together, and DC performing simultaneous communication between the UE and each of the two NG-RAN nodes.

The radio communication unit 210 transmits and receives various channels of the physical layer. The channel includes a control channel and a data channel.

The control channel may include a PDCCH (Physical Downlink Control Channel), a PUCCH (Physical Uplink Control Channel), a RACH (Downlink Control Information (DCI) with Random Access Channel, Random Access Radio Network Temporary Identifier (RA-RNTI)), a Physical Broadcast Channel (PBCH), and the like.

The data channels include PDSCH (Physical Downlink Shared Channel) and PUSCH (Physical Uplink Shared Channel). Data may refer to data transmitted over a data channel.

In the present embodiment, the radio communication unit 210 may receive a downlink channel to which the time information is transmitted after transmitting a transmission request of the time information used in the system. In this embodiment, the radio communication unit 210 constitutes a reception unit for receiving a downlink channel.

Specifically, the radio communication unit 210 receives the logical channel in the downlink (DL). More specifically, the radio communication unit 210 receives DL DCCH (Dedicated Control Channel).

The radio communication unit 210 may operate so as to receive the DL DCCH after the time management unit 230 transmits the UEAssistanceInformation (refer to 3GPP TS 38.331 section 5.7.4 or the like) including the reference-TimePreference-r16 (transmission request) to the network. The post-transmission may include monitoring the DL DCCH at the same time as the transmission of the UEAssistanceInformation, or monitoring the DL DCCH after a certain period of time has elapsed after the transmission of the UEAssistanceInformation.

The system information reception unit 220 receives system information transmitted from the network. Specifically, the system information reception unit 220 can receive various System Information Blocks (SIB) broadcast from the gNB 100. The system information may include a Master Information Block (MIB), and the system information may be called broadcast information or the like.

In particular, in this embodiment, the system information reception unit 220 can receive the SIBs 1 and 9. SIB 9 includes time information used in the system, specifically referenceTimeInfo-r16 (refer to 3GPP TS 38.331 section 6.3.2).

The time management unit 230 manages time information used in the system. Specifically, the time management unit 230 acquires the time (timing) of the internal system clock (which may be called the local clock) used in the NR (5G) system. Each of the function blocks constituting the UE 200 can operate in synchronization with the time information and at a timing according to the time information.

In this embodiment, the time management unit 230 can transmit a transmission request of time information (referenceTimeInfo-r16) used in the system to the network. In the present embodiment, the time management unit 230 constitutes a transmission unit for transmitting a transmission request to a network.

Specifically, the time management unit 230 can transmit UEAssistanceInformation including referenceTimePreference-r16 (transmission request) to the network.

The message processing unit 240 executes processing of a message transmitted from the network to the UE 200. Specifically, the message processing unit 240 can receive a Short Message (refer to 3GPP TS 38.331 section 6.5) transmitted from the network. Short messages can be transmitted over PDCCH using P-RNTI (Paging Radio Network Temporary Identifier). In addition, the Short Message may be transmitted with or without an associated paging message using the short message field of the format (DCI format) 1_0 of the downlink control information (DCI).

In particular, in this embodiment, the message processing unit 240 can receive a message indicating that the time information used in the system has been updated, specifically, a Short Message. In this embodiment, the message processing unit 240 constitutes a reception unit for receiving a message.

Table 1 shows a configuration example of the Short Message according to this embodiment.

TABLE 1

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4 | If set to 1: indication of a modification of referenceTimeInfo in SIB9. |
| 5-8 | Not used in this release of the specification, and shall be ignored by UE if received. |

Bit 1 indicates the most significant bit (MSB). As shown in Table 1, when bit 4 is set to "1", a change (update) of referenceTimeInfo-r16 included in SIB 9 may be indicated.

Note that the bit position and the content associated with "1" are not limited to the example of Table 1. The bit position indicating that the time information is updated may be other than 4, or may indicate a change (update) of referenceTimeInfo-r16 included in SIB 9 if it is set to 0.

The control unit 250 controls each functional block constituting the UE 200. In particular, in this embodiment, the control unit 250 can acquire time information used in the system from the network.

Specifically, the control unit 250 can acquire referenceTimeInfo-r16 included in the SIB 9. The control unit 250 can also obtain referenceTimeInfo-r16 included in DLInformationTransfer.

The control unit 250 may also acquire time information in response to receipt of a message from the network, more specifically, a Short Message. Specifically, when the control unit 250 receives the Short Message in which the bit indicating that the time information has been updated (see Table 1) is set, it may acquire the referenceTimeInfo-r16 included in the SIB 9.

The control unit 250 may acquire the referenceTimeInfo-r16 included in the SIB 9 immediately after receiving the Short Message, or may continuously monitor the SIB 9 for a certain period of time after receiving the Short Message and acquire the referenceTimeInfo-r16 included in the SIB 9.

Furthermore, the control unit 250 may acquire the time information contained in the downlink channel, specifically, the DLDCCH. Specifically, the control unit 250 may acquire the referenceTimeInfo-r16 included in the DLInformationTransfer by monitoring the DL DCCH after the time management unit 230 transmits the UEAssistanceInformation including the referenceTimePreference-r16 (transmission request) to the network.

If the DLDCCH does not contain time information, the control unit 250 may acquire system information transmitted from the network, specifically, the referenceTimeInfo-r16 contained in the SIB 9.

Note that the control unit 250 may simultaneously monitor both the DL DCCH and the system information (specifically, the common search space (CSS)) after transmitting the UEAssistanceInformation including the referenceTimePreference-r16 (transmission request) to the network. The control unit 250 may suspend the other monitor if it is able to obtain the time information first through a DLInformationTransfer or SIB 9 message.

(3) Operation of Radio Communication System

Next, the operation of radio communication system 10 will be described. Specifically, an operation related to the acquisition of time information (referenceTimeInfo-r16) by the UE 200 will be described.

(3.1) Assumptions

In 3GPP Release-16, as described above, SIB 9 may include an IE called referenceTimeInfo-r16. referenceTimeInfo-r16 is an IE that indicates the NR (5 G) internal system clock.

When referenceTimeInfo-r16 is included in SIB 9, it is specified that the time change (update) in the system is not accompanied by system information change notification or value tag modification in SIB 1.

FIG. 3 shows an example of the configuration of the ReferenceTimeInfo. As shown in FIG. 3, a ReferenceTimeInfo can include a ReferenceTimeInfo-r16 and a ReferenceTime-r16 (underlined).

Here, time, specifically, the field of ReferenceTime-r16 may indicate a time reference with a granularity of 10 ns. The indicated time is referenced in the network and may be referenced without compensating for the propagation delay at the radio frequency (RF).

The instruction time in units of 10 ns from the origin may be refDays*86400*1000*100,000+refSeconds*1000*100, 000+refMilliSeconds*100,000+refTenNanoSeconds as specified in 3GPP.

The refDays field may specify the number of consecutive days from the origin of the time field (if the day count starts at 0).

When the ReferenceTimeInfo field is received by the DLInformationTransfer message, the time field may indicate the time at the end boundary of the system frame indicated by referenceSFN. The UE 200 may consider the frame (indicated by referenceSFN) to be the frame closest (past or future) to the frame that received the message.

When the ReferenceTimeInfo field is received by SIB9, the time field may indicate the time at the end boundary of the SI (System Information) window transmitting the SIB9 or at the SFN boundary immediately after it.

In addition, if the ReferenceTimeInfo field is received by SIB9, the field may be excluded when determining a change in system information. In other words, the time may be changed without changing the valueTag of the SIB1 even when the system information is changed.

As described above, the 3GPP Release-16 introduces a mechanism for requesting time information from the UE 200 to the gNB 100 (network).

FIG. 4 shows a configuration example of OtherConfig and UEAssistanceInformation. The network can set the referenceTimePreferenceReporting (underlined) using the OtherConfig IE. The UE 200 can send a referenceTimePreference-r16 (Set to true when requesting time information, see underlined part) to the network using UEAssistanceInformation.

(3.2) Operation Example 1

In order to ensure high-precision synchronization between the gNB 100 and the UE 200, that is, accurate synchronization of time (timing) within the system, it is necessary for the gNB 100 to transmit information (time information) indicating the time periodically updated to the UE 200 by broadcast or unicast.

In this operation example, when the gNB 100 transmits the changed referenceTimeInfo-r16 using the SIB 9, the gNB 100 and the UE 200 can operate as follows in order to reliably notify the UE 200 that the time has changed.

Figure 5:
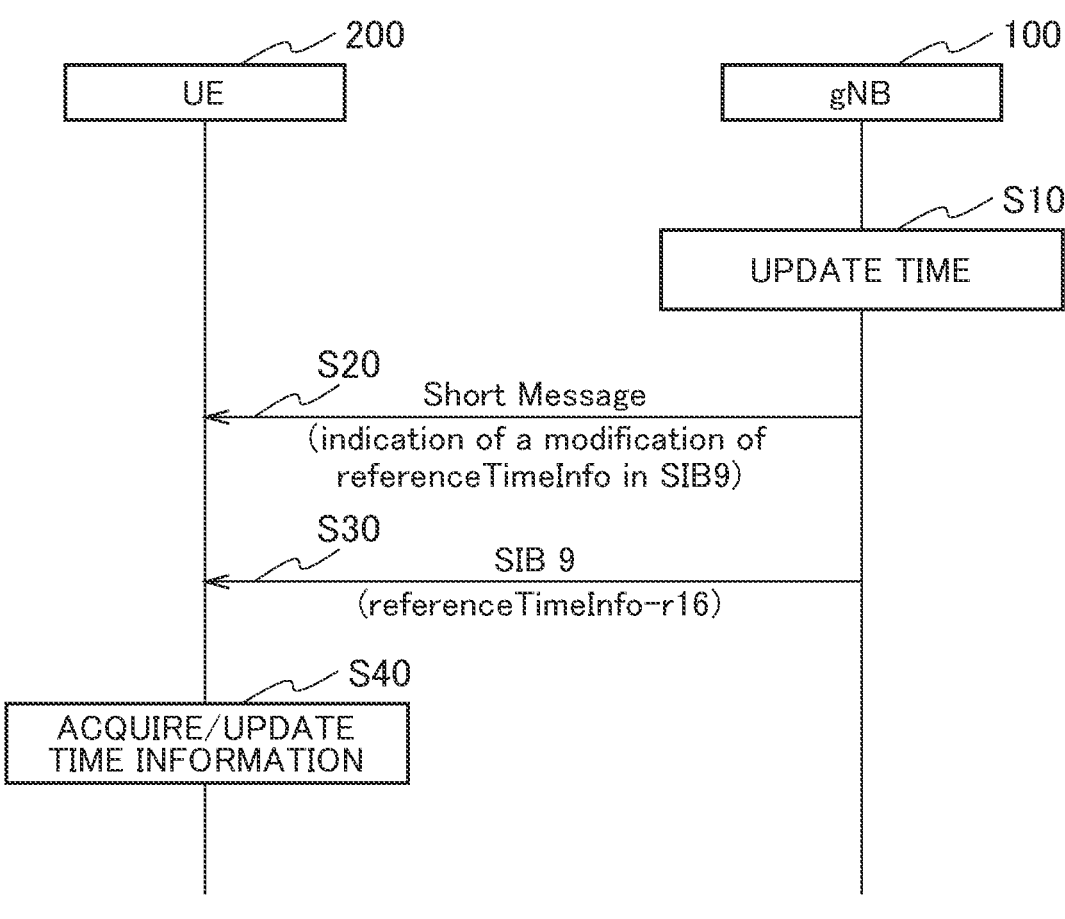
FIG. 5 is a diagram showing an update sequence of time information according to operation example 1.

FIG. 5 shows an update sequence of the time information according to the operation example 1. As shown in FIG. 5, the gNB 100 updates the time (internal system clock) in the system (S10).

The gNB 100 transmits a Short Message prior to transmission of the SIB 9 including the referenceTimeInfo-r16 (S20).

Specifically, the gNB 100 transmits a Short Message (see Table 1) to the UE 200 in which a bit (For example, bit 4) indicating a change in the referenceTimeInfo-r16 included in the SIB 9 is set.

For example, gNB 100 may implement the notification using a new codepoint for bit 4 (or 5~8) of the Short Message. For example, when bit 4 is used, as shown in Table 1, when bit 4 is set to "1", a change (update) of reference-TimeInfo-r16 included in SIB 9 may be indicated.

In order for the UE 200 to attempt to receive the SIB 9, the gNB 100 normally needs to transmit the SIB 1 in which the valueTag included in the SI-Scheduling Info of the SIB 1 is changed. The UE 200 attempts to receive the SIB 9 when the valueTag included in the SI-SchedulingInfo is changed.

The gNB 100 may notify the UE 200 of the change of the referenceTimeInfo-r16 by using bit 1 (systemInfoModification) of the Short Message.

Next, the gNB 100 transmits the SIB 9 including the changed referenceTimeInfo-r16 toward the UE 200 (S30). The UE 200 receives the SIB 9 in response to the reception of the short message.

That is, the UE 200 may re-acquire the SIB 1 when it receives a change in the system information described above (indication about change of system information (systemInfoModification in Short Message)) or a SIB 9 including the referenceTimeInfo-r16 at the time of idle (RRC_IDLE) of the radio resource control layer (RRC), at the paging opportunity (PO) per DRX (Discontinuous Reception) cycle at the time of RRC_INACTIVE, or at the PO per modification period at the time of RRC CONNECTED (exist searchSpaceSIB1 and pagingSearchSpace with active BWP and common search space (CSS)). Furthermore, the UE 200 may acquire the SIB 9 even if the valueTag of the SIB 9 is changed or not in the SI-Scheduling Info.

Then, the UE 200 acquires the time information (referenceTimeInfo-r16) included in the SIB 9, and updates the time information (clock) used in the UE 200 (S40).

(3.3) Operation Example 2

When the UE 200 in the RRC CONNECTED state transmits the UEAssistanceInformation including the referenceTimePreference-r16 (transmission request) to the gNB 100 (network) to request the time information of the internal system clock, the gNB 100 can transmit the time information by SIB 9 (broadcast) or DLInformationTransfer (unicast) as described above.

In this operation example, the UE 200 can operate as follows in order to surely receive the time information even when the time information is transmitted by either SIB 9 or DLInformationTransfer after transmitting the transmission request to the network.

Figure 6:
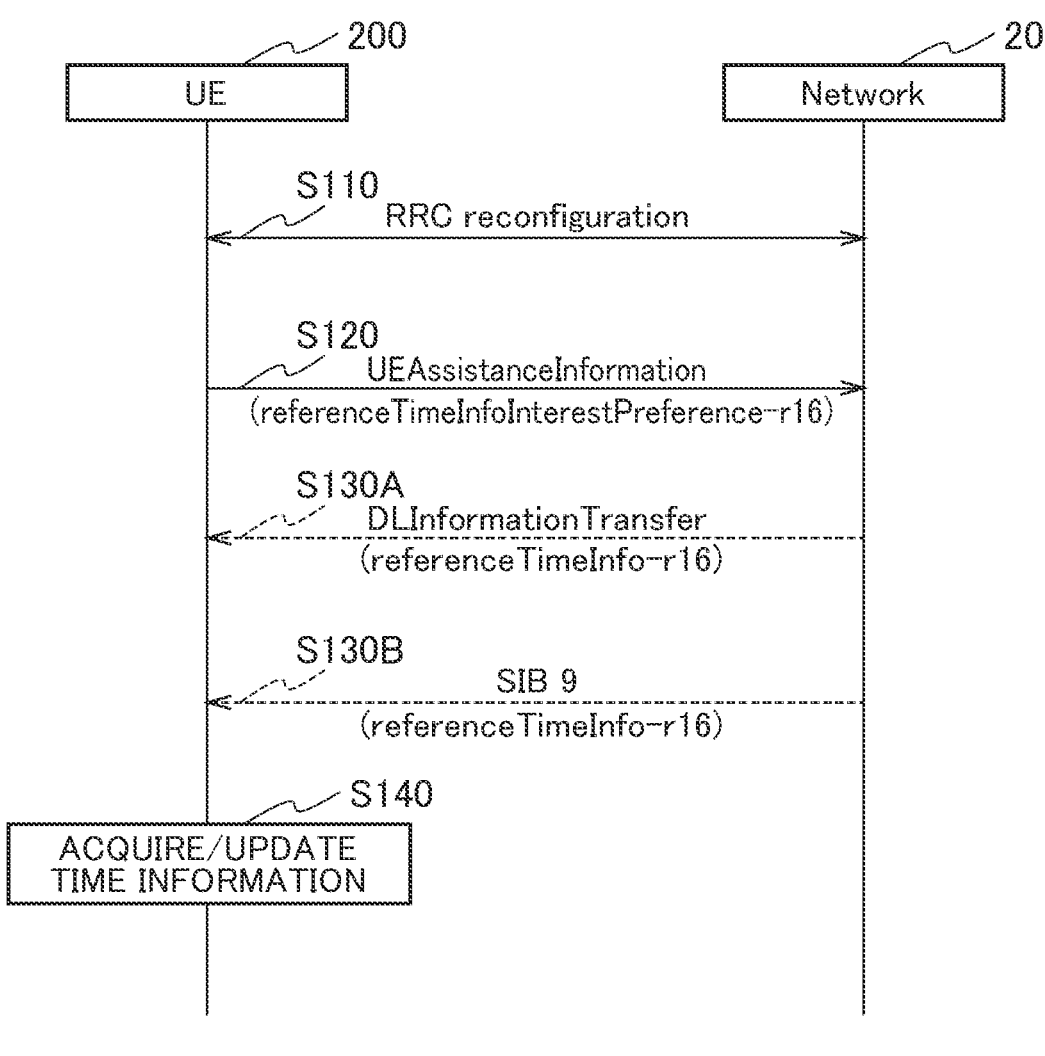
FIG. 6 is a diagram showing an update sequence of time information according to operation example 2.

FIG. 6 shows an update sequence of the time information according to the second operation example. As shown in FIG. 6, the network (Specifically, NG-RAN 20 including gNB 100) and the UE 200 perform processing in the RRC, such as RRC reconfiguration (S110). As a result, the UE 200 enters the RRC CONNECTED state.

The UE 200 then transmits the UEAssistanceInformation including the referenceTimePreference-r16 to the network (S120). As described above, the referenceTimePreference-r16 may be transmitted at any time when the UE 200 needs time information to be used in the system.

The network (gNB 100) can transmit a DLInformation-Transfer including time information (referenceTimeInfo-r16) according to the UEAssistanceInformation received from the UE 200 (S130A). FIG. 7 shows a configuration example of DLInformationTransfer. As shown in FIG. 7, a DLInformationTransfer may include referenceTimeInfo-r16 (underlined).

Alternatively, the network (gNB 100) may transmit SIB 9 (see FIG. 4) including referenceTimeInfo-r16 in response to the UEAssistanceInformation (S130B).

That is, the UE 200 may preferentially monitor the DL DCCH (logical channel) after transmitting the reference-TimePreference-r16 by the UEAssistanceInformation, receive the DLInformationTransfer if the DLInformation-Transfer exists in the DL DCCH-Message, and acquire the referenceTimeInfo-r16.

In addition, the UE 200 may preferentially monitor the DL DCCH (logical channel) after transmitting the reference-TimePreference-r16 according to the UEAssistanceInformation, and re-acquire the SIB 1 when the common search space (configured by searchSpaceSIB1 and paging-SearchSpace) is set when the DLInformationTransfer does not exist and when a system information change (indication about change of system information (systemInfoModification in Short Message)) is received. Furthermore, the UE 200 may acquire the SIB 9 even if the valueTag of the SIB 9 is changed or not in the SI-Scheduling Info.

Alternatively, the UE 200 may preferentially monitor the DL DCCH (logical channel) after transmitting the reference-TimePreference-r16 according to the UEAssistanceInformation, and re-acquire the SIB 1 when the common search space (configured by searchSpaceSIB1 and paging-SearchSpace) is set and the referenceTimeInfo modification is received in the Short Message when the DLInformation-Transfer does not exist. Furthermore, the UE 200 may acquire the SIB 9 even if the valueTag of the SIB 9 is changed or not in the SI-Scheduling Info.

In addition, the UE 200 may simultaneously (in parallel) monitor both the DL DCCH (logical channel) and the common search space (CSS) after transmitting the referenceTimePreference-r16 by means of the UEAssistanceInformation, and acquire the referenceTimeInfo-r16 included in the message received earlier when the time information can be received by means of either the DLInformationTransfer or SIB 9 (Short Message) message.

If the DLInformationTransfer comes first, the UE 200 only needs to read the ReferenceTimeInfo included in the DLInformationTransfer. On the other hand, when the SIB 9, specifically, the Short Message comes first, the UE 200 receives the SIB 1 and reads the ReferenceTimeInfo included in the SIB 9 indicated by the SI-Scheduling Info.

The UE 200 acquires the time information (reference-TimeInfo-r16) contained in the DLInformationTransfer or SIB 9 by the method described above, and updates the time information (clock) used in the UE 200 (S140).

(4) Operational Effects

According to the embodiment described above, the following effects are obtained. Specifically, the UE 200 can receive a short message indicating that the time information is updated, and can acquire the time information included in the SIB 9 in response to the reception of the short message.

Therefore, the UE 200 can surely recognize that the time information has been updated by receiving the short message. Thus, the UE 200 can quickly and efficiently acquire the time information even when the time information in the system is updated.

Further, the UE 200 can receive a downlink channel (DL DCCH) to which the time information is transmitted after transmitting a transmission request (referenceTimePreference-r16) of the time information used in the system. Therefore, the UE 200 can surely acquire the updated time information at any timing where the updated time information is required.

Furthermore, the UE 200 can acquire time information included in the system information (SIB 9) transmitted from the network when time information is not included in the downlink channel (DL DCCH), specifically, DLInformationTransfer.

Thus, when the updated time information is required, the UE 200 can quickly and efficiently acquire the time information in the NR (5G) system.

(5) Other Embodiments

Although the contents of the present invention have been described in accordance with the embodiments described above, it is obvious to those skilled in the art that the present invention is not limited to these descriptions and that various modifications and improvements are possible.

For example, in the above-described embodiment, an example in which ReferenceTimeInfo, specifically, referenceTimeInfo-r16 is used as time information has been described, but information other than ReferenceTimeInfo may be used as long as it can indicate a time (Internal system clock) used in an NR (5G) system. For example, information indicating a difference from a clock used in the TSN 30 or information indicating a difference from some other reference clock may be used.

In the above embodiment, the referenceTimePreference-r16 is used as the time information transmission request used in the system.

Further, although operation example 1 and operation example 2 have been described in the above embodiment, some or all of both operation examples may be executed in combination within radio communication system 10.

The block diagram (FIG. 2) used in the description of the above-described embodiment shows a block for each function unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. For any of the above, as explained above, the realization method is not particularly limited to any one method.

Figure 8:
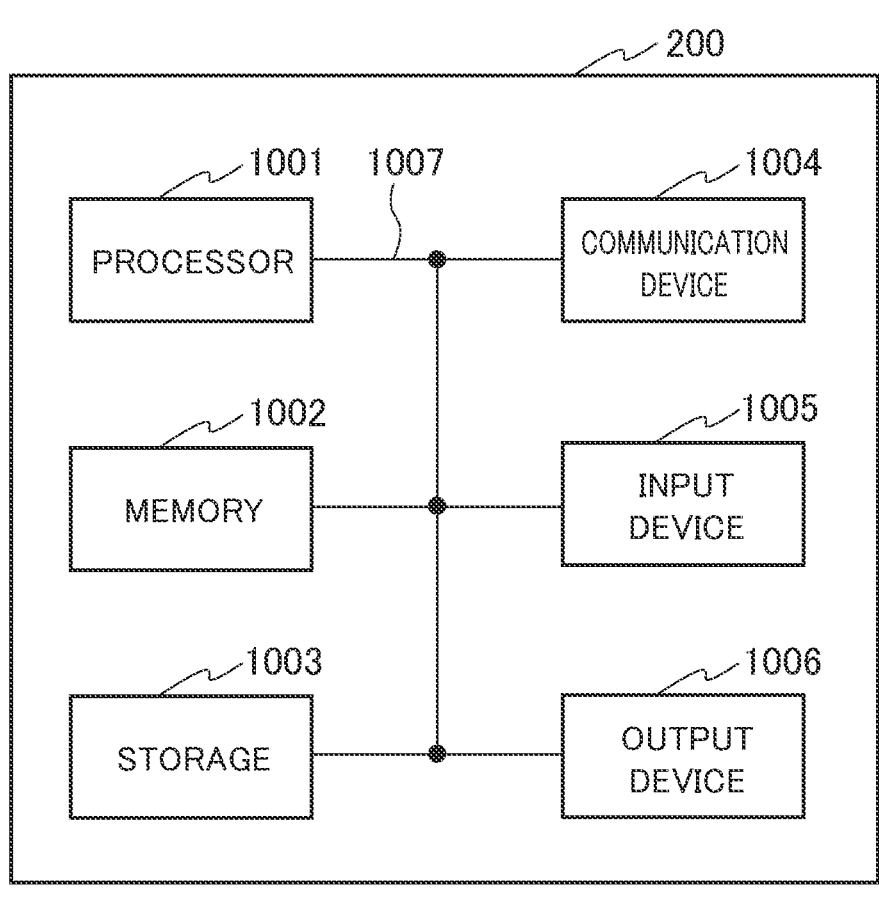
FIG. 8 shows an example of a hardware configuration of the UE 200.

Further, the UE 200 described above may function as a computer that performs processing of the radio communication method of the present disclosure. FIG. 8 is a diagram showing an example of a hardware configuration of the UE 200. As shown in FIG. 8, the UE 200 may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the UE 200 (see FIG. 2) is implemented by any hardware element or combination of hardware elements of the computer device.

Functions in the UE 200 are realized by reading predetermined software (programs) onto hardware such as the processor 1001 and the memory 1002, so that the processor 1001 performs arithmetic operations to control communication by communication device 1004, or to control at least one of reading and writing of data in the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (UM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Software, instructions, information, and the like may be transmitted and received via a transmission medium. For example, if software is transmitted from a website, server, or other remote source using at least one of wired (Coaxial cable, fiber-optic cable, twisted-pair, digital subscriber line (DSL), etc.) and wireless (Infrared, microwave, etc.) technologies, at least one of these wired and wireless technologies is included within the definition of a transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Similarly, the mobile station in the present disclosure may be read as a base station. In this case, the base station may have the function of the mobile station.

A radio frame may be composed of one or more frames in the time domain.

Each frame or frames in the time domain may be referred to as a subframe. A subframe may be further configured by one or more slots in the time domain.

The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain.

The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or"decision" may include regarding some action as "judgment" or"decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C".

Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
30 TSN
40 End Station
100 gNB
200 UE
210 Radio communication unit
220 System Information reception unit
230 Time management unit
240 Message processing unit
250 Control unit
1001 Processor
1002 Memory
1003 Storage
1004 Communication device
1005 Input device
1006 Output device
1007 Bus

The invention claimed is:

1. A terminal comprising:
a receiver that receives a DLInformationTransfer message from a network; and
a processor that acquires:
time information included in the DLInformationTransfer message, in response to determining that the time information is present in the DLInformationTransfer message,
wherein, after acquiring the time information from the DLInformationTransfer message, the processor stops acquiring the time information included in system information transmitted from the network; and the time information included in the system information in response to determining that the time information is not present in the DLInformationTransfer message.

2. The terminal according to claim 1, further comprising:
a transmitter that transmits a transmission request for the time information to the network.

3. A communication method of a terminal, the method comprising:
a reception step of receiving a DLInformationTransfer message from a network; and
a control step of acquiring:
time information included in the DLInformationTransfer message, in response to determining that the time information is present in the DLInformationTransfer message,
wherein, after acquiring the time information from the DLInformationTransfer message, stopping acquiring the time information included in system information transmitted from the network; and
the time information included in the system information is acquired in response to determining that the time information is not present in the DLInformationTransfer message.

4. A communication system including a base station and a terminal, wherein
the base station comprises
a transmitter that transmits time information used in a system, using a DLInformationTransfer message or system information, and
the terminal comprises:
a receiver that receives the DLInformationTransfer message from the base station; and
a processor that acquires:
the time information included in the DLInformationTransfer message, in response to determining that the time information is present in the DLInformationTransfer message,
wherein after acquiring the time information from the DLInformationTransfer message, the processor stops acquiring the time information included in system information transmitted from the base station; and
the time information included in the system information in response to determining that the time information is not present in the DLInformationTransfer message.

* * * * *